(12) United States Patent
Bower, III

(10) Patent No.: US 7,356,820 B2
(45) Date of Patent: Apr. 8, 2008

(54) METHOD OF LAUNCHING LOW-PRIORITY TASKS

(75) Inventor: Fred A. Bower, III, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 09/898,978

(22) Filed: Jul. 2, 2001

(65) Prior Publication Data

US 2003/0005026 A1    Jan. 2, 2003

(51) Int. Cl.
  G06F 9/46        (2006.01)
(52) U.S. Cl. .............. 718/103; 718/100; 718/102; 718/107; 719/318
(58) Field of Classification Search ....... 718/100–108; 717/120; 709/200, 224, 226, 227, 202; 719/318
See application file for complete search history.

(56) References Cited

U.S. PATENT DOCUMENTS

| | | | | |
|---|---|---|---|---|
| 6,021,438 A * | 2/2000 | Duvvoori et al. | ........... | 709/224 |
| 6,088,796 A * | 7/2000 | Cianfrocca et al. | ......... | 713/152 |
| 6,119,118 A * | 9/2000 | Kain, III et al. | .............. | 707/10 |
| 6,349,336 B1 * | 2/2002 | Sit et al. | .................... | 709/227 |
| 6,393,481 B1 * | 5/2002 | Deo et al. | ................... | 709/224 |
| 6,442,550 B1 * | 8/2002 | Rajamony | .................... | 707/10 |
| 6,460,037 B1 * | 10/2002 | Weiss et al. | .................. | 707/10 |
| 6,460,070 B1 * | 10/2002 | Turek et al. | ................. | 709/202 |
| 6,529,932 B1 * | 3/2003 | Dadiomov et al. | ......... | 718/101 |
| 6,621,851 B1 * | 9/2003 | Agee et al. | .................. | 375/130 |
| 6,647,421 B1 * | 11/2003 | Logue et al. | ................ | 709/226 |
| 6,697,962 B1 * | 2/2004 | McCrory et al. | ............. | 714/27 |
| 6,704,819 B1 * | 3/2004 | Chrysanthakopoulos | .... | 710/240 |
| 6,782,495 B2 * | 8/2004 | Bernklau-Halvor | .......... | 714/44 |
| 2002/0055846 A1 * | 5/2002 | Tsuchitani et al. | .......... | 704/275 |
| 2002/0055980 A1 * | 5/2002 | Goddard | ..................... | 709/217 |
| 2002/0107905 A1 * | 8/2002 | Roe et al. | ................... | 709/202 |
| 2002/0112089 A1 * | 8/2002 | Zargham et al. | ............ | 709/317 |
| 2002/0133805 A1 * | 9/2002 | Pugh et al. | ................. | 717/120 |
| 2002/0138670 A1 * | 9/2002 | Johnson | ......................... | 710/6 |
| 2002/0147389 A1 * | 10/2002 | Cavallaro et al. | ........... | 600/301 |
| 2002/0156932 A1 * | 10/2002 | Schneiderman | ............. | 709/317 |
| 2003/0214943 A1 * | 11/2003 | Engstrom et al. | ........... | 370/353 |
| 2004/0133609 A1 * | 7/2004 | Moore et al. | ............... | 707/200 |

* cited by examiner

Primary Examiner—Meng-Al T. An
Assistant Examiner—Lilian Vo
(74) Attorney, Agent, or Firm—Lieberman & Brandsdorfer, LLC

(57) ABSTRACT

A driver is provided to manage launching of tasks at different levels of priority and within the parameters of the firmware interface. The driver includes two anchors for managing the tasks, a dispatcher and an agent. The dispatcher operates at a medium priority level and manages communication from a remote administrator. The agent functions to receive communications from the dispatcher by way of a shared data structure and to launch lower priority level tasks in respond to the communication. The shared data structure stores communications received from the dispatcher. Upon placing the communication in the shared data structure, the dispatcher sends a signal to the agent indicating that a communication is in the data structure for reading by the agent. Following reading of the communication in the data structure, the agent launches the lower priority level task and sends a signal to the data structure indicating the status of the task. Accordingly, a higher level task maintains its level of operation and spawns lower level tasks through the dispatcher in conjunction with the agent.

6 Claims, 3 Drawing Sheets

METHOD OF LAUNCHING LOW-PRIORITY TASKS

BACKGROUND OF THE INVENTION

1. Technical Field

This invention relates to a driver operating in a firmware environment. More specifically, the driver manages launching of tasks at different priority levels while maintaining a predetermined level of operation.

2. Description of the Prior Art

Firmware is software that is stored in hardware, such that the software is retained even after power to the hardware ceases. At boot time, the firmware of a computer or computer system stores and uses information describing a computer's processors, nodes, memory and other devices. The firmware operates on a parallel platform to the operating system.

In prior art computers, the firmware enabled system interrupts to occur in order to launch different applications at different priority levels. The prior art systems require a greater amount of functionality to accommodate system interrupts. Some firmware interface environments disable system interrupts to reduce the amount of functionality required to operate the machines in the system. The Intel Extensible Firmware Interface (EFI) is one firmware environment which reduces functionality required to operate the machine by disabling interrupts. In addition to disabling system interrupts, tasks within the EFI may temporarily increase their priority level of operation, but they are not allowed to decrease the priority level. Accordingly, tasks operating within the EFI environment, or similar platforms, are not permitted to execute system interrupts to execute tasks that may be operating at different levels of priority and may increase priority levels.

There are two types of operating programs within the EFI: a driver and an application. The driver provides a set of resources, i.e. programming interfaces. Once a driver is loaded within the firmware environment, it remains in the system for future application. The driver is not permitted to load other drivers after its initialization has completed. In addition, the EFI also prohibits the ability to load applications from a resident driver. An application is an executable program that is loaded, executed and expires. During run time, the application can load other drivers and applications. Accordingly, the application is executed for loading a driver to operate within the firmware environment and within the protocols of the system.

There is therefore a need to launch a driver that will prioritize execution of different priority levels of tasks within the confines of the EFI firmware environment. The driver must be launched by an application that will allow it to remain resident within the firmware and will provide all the required protocols for operating independently and without the need to launch secondary drivers. Accordingly, it is desirable to design a driver that will allow lower priority level applications to be launched without executing a system interrupt and without changing the priority level of a higher level application already in use.

SUMMARY OF THE INVENTION

This invention comprises a driver for operating in a firmware environment. The driver manages launching of tasks at different priority levels while maintaining a predetermined level of operation.

A first aspect of the invention is a method of spawning a lower priority level task from a higher level priority task. A dispatcher is utilized for receiving messages from a remote administrator. An agent is utilized for launching a lower priority task. Upon receiving a message to spawn a lower priority task, the dispatcher places the message in a shared data structure. The dispatcher then sets a flag for signaling to the agent receipt of the message. The agent launches the lower priority task in response to the message and resets the flag for future task assignments.

A second aspect of the invention is a computer system which includes a message manager to receive messages from a remote administrator, and a task manager to launch a lower priority task in response to a message received from the message manager. In addition, a data structure is provided to communicate the message from the message manager to the task manager. A dispatcher manager is provided to forward the instruction from the message manager to the data structure. In addition, a flag is provided to signal to the task manager receipt of the instruction in the data structure. Following the launch of the lower priority task, the task manager resets the flag. During the communication and launching of the lower priority task, a higher priority task maintains its level of operation.

A third aspect of the invention is an article comprising a computer-readable data storage medium. In the medium, the article includes means for receiving messages from a remote administrator and means for launching lower priority level tasks in response to the messages. The message receiving means stores the message in a data structure. A flag is provided by the message receiving means to signal receipt of instructions by the data structure to the launching means. A higher priority task maintains its level of operation during launch of the lower priority task.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a low-level operating environment, system interrupts may be disabled to reduce the amount of functionality required to operate the machine. This environment allows operating functions to increase their specific level of operation, but does not allow them to decrease their level of operation. The method and system of the preferred embodiment employ a shared data structure in conjunction with a communication tool to allow a higher priority task to launch lower priority tasks. Accordingly, this allows for a higher priority task to maintain a specific level of operation.

Technical Background

Specific extensible firmware environments are known to operate at a low level without the use of system interrupts. The Intel EFI is one such firmware environment. In addition to disabling interrupts, the firmware places additional limitations in its functionality. For example, the firmware limits a task to one of three priority levels, low, medium and high.

A given task may temporarily increase its priority level of operation if it is operating at a low or medium priority level, but it is not allowed to decrease its level of operation. In addition, the only place the firmware enables a driver to load other firmware modules is in its initialization code. Accordingly, a driver to enable launching of lower priority tasks must work within the confines of the firmware protocols.

Figure 1:
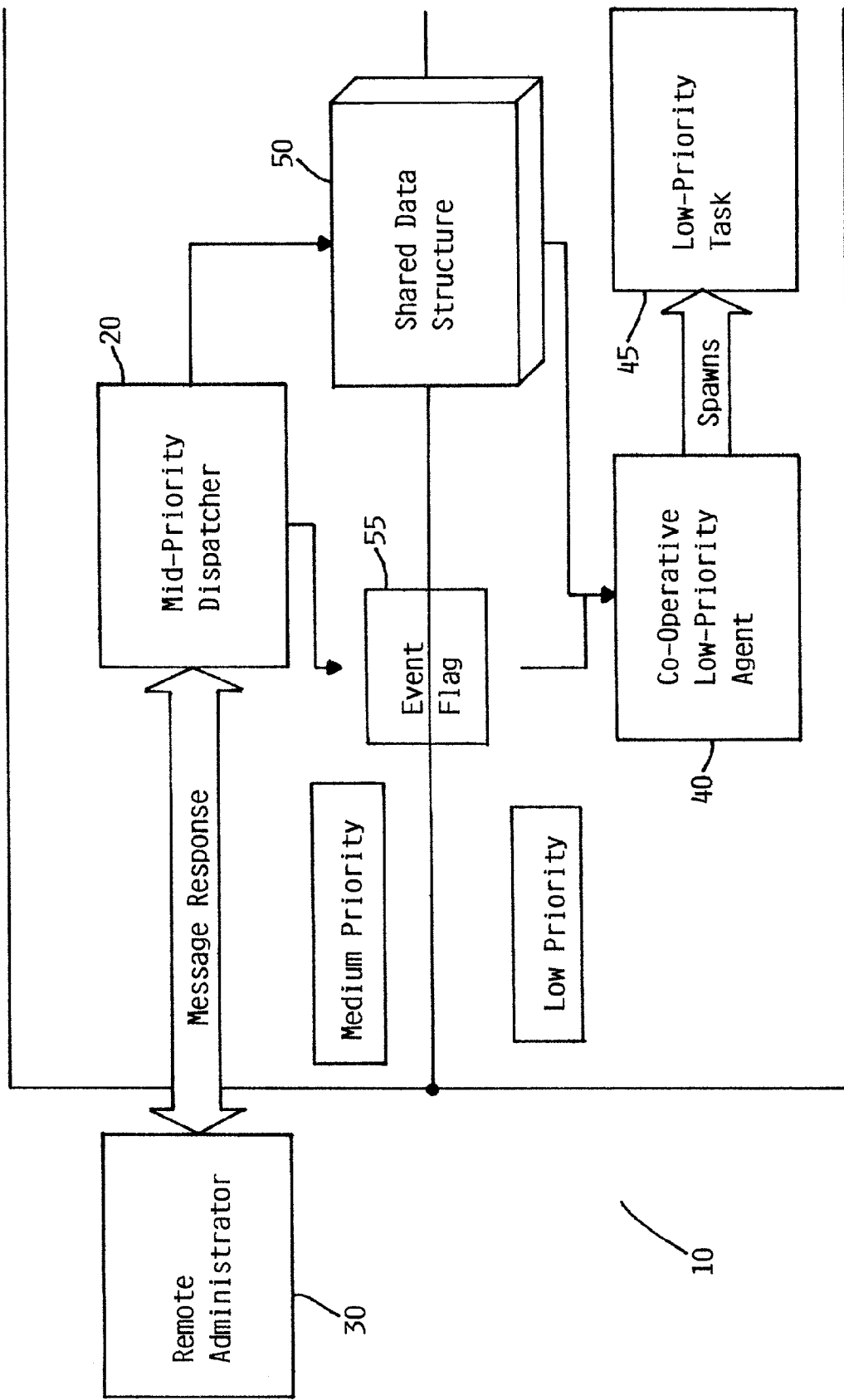
FIG. 1 is a block diagram of the driver according to the preferred embodiment of this invention, and is suggested for printing on the first page of the issued patent.

The driver must provide for a higher priority task to maintain operation at a higher level of operation, i.e. high or medium level in a three tier environment. FIG. 1 is a block diagram 10 illustrating the flow of communication in the diagnostic device driver of the preferred embodiment. The two primary components of the driver are a dispatcher 20 for receiving messages from a remote administrator 30, and an agent 40 for launching lower level tasks. The remote administrator 30 exists within the firmware and is responsible for running diagnostics. The dispatcher 20 receives messages from the remote administrator 30 and responds to receipt of the messages. Upon receiving a communication from the remote administrator 30, the dispatcher 20 communicates receipt to a data structure 50. Accordingly, the dispatcher 20 functions as a communication tool from the remote administrator 30 to the data structure 50.

The dispatcher 20 operates at a medium priority level and functions to receive and respond to messages from a remote administrator 30, and to place the messages in the shared data structure 50. Within the restrictions of the firmware environment, the dispatcher is unable to load tests. The dispatcher 20 does not execute operations, rather it functions as a communication tool for a higher level task desiring to launch a lower level task. In the confines of the system design, the higher level task cannot lower its priority level. Therefore, the higher level task must communicate the desire to spawn a lower priority level task. The agent 40 is resident at a lower priority level to act as a command dispatcher and to launch applications and load drivers 45 at lower priority levels. Accordingly, the dispatcher 20 is employed to assist in the spawning of tasks at a lower priority level of operation than the higher level task.

The data structure 50 is shared between the dispatcher 20 and the agent 40. The shared memory provides a basis for communication between the higher level task and the agent 40. The shared data structure 50 is a communication base shared by the two components. The agent 40 operates at a lower priority level than the dispatcher 20. Upon receiving messages from the remote administrator 30, the dispatcher 20 communicates receipt with the shared data structure 50. The shared data structure 50 communicates receipt of a communication from the dispatcher to the agent 40. A flag 55 is utilized as a communication tool from the shared data structure 50 to the agent 40. Accordingly, the dispatcher 20 and the agent 40 are the two major components of the diagnostic driver utilizing the flag 55 as the communication tool therebetween.

The agent 40 functions to launch lower level tasks in a loop. The agent 40 launches a lower level task only when prompted to do so by an event triggered by a higher level task. The agent 40 functions to perform a desired activity on behalf of the higher level task, while allowing the higher level task to maintain operation at its specified level. The flag 55 is instituted to awaken the agent 40 when a spawning of a lower level task is desired. Upon receiving the flag 55, the agent 40 reads the message placed in the shared data structure by the dispatcher 20. The flag 55 is a signal for the agent 40 to read the shared data structure 50 at a particular position. The agent 40 then launches the requested task at the lower priority level. Once the lower level task 60 has been launched, the agent 40 resets the flag 55. Accordingly, the agent 40 remains in an inactive state until such time as a flag 55 is set by the placement of a command message in the shared data structure 50.

Figure 2:
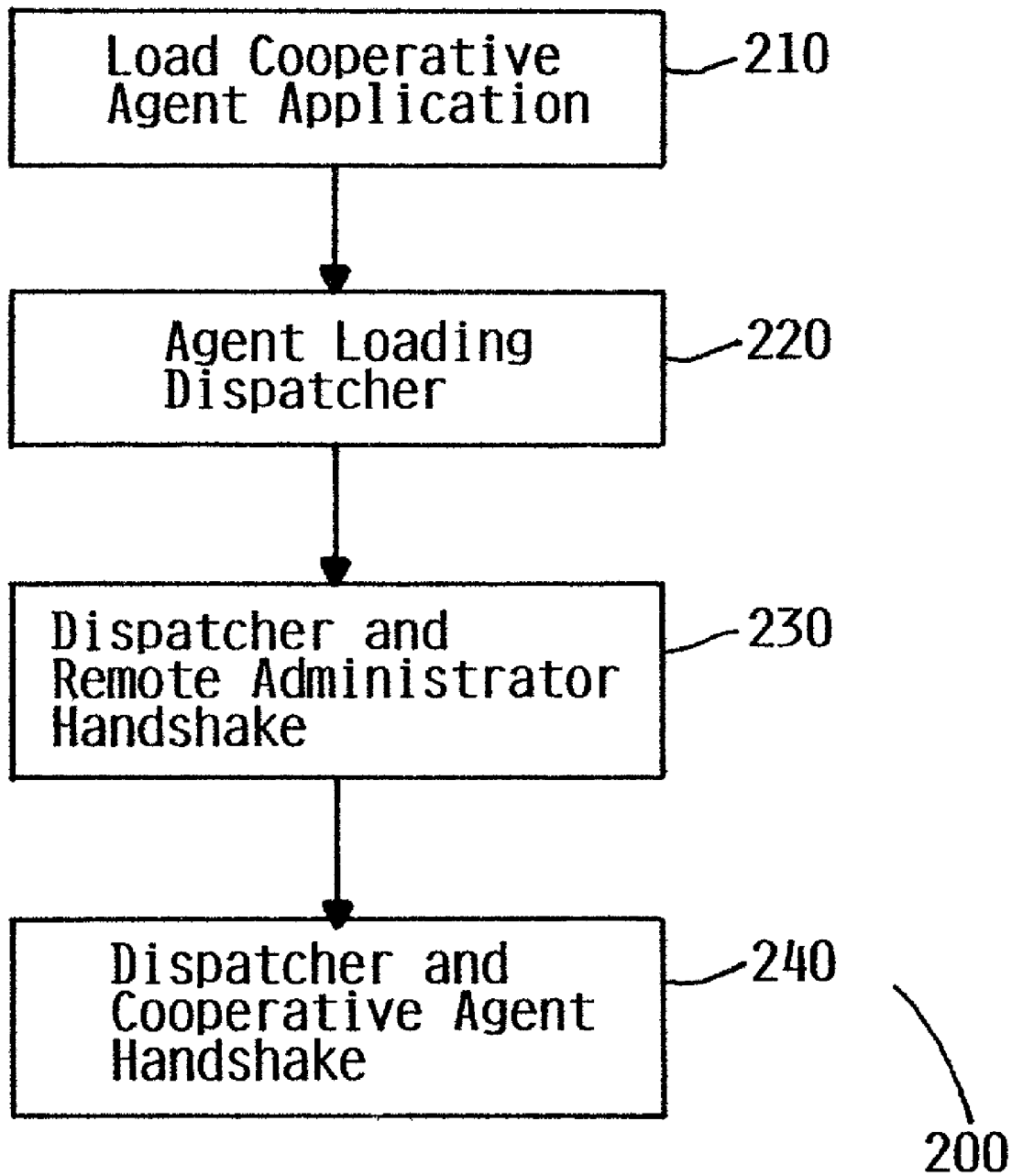
FIG. 2 is a flow chart illustrating the process of initializing the driver.

FIG. 2 is a flow chart 200 illustrating implementation of the structure of the preferred embodiment. The firmware only permits drivers to load other firmware modules in its initialization code, it does not permit a driver to load other drivers after the driver's initialization has completed. Within these confines, the agent in the form of an application is the first module to be loaded 210. An application can load other applications and drivers during run time. The agent application is responsible for loading the remaining components of the structure, including the dispatcher 220. The remote administrator is existent within the firmware, and does not require any loading by the agent application. The remote administrator represents a control entity within the firmware and is responsible for running diagnostics and a path to the user interface. During loading of the dispatcher driver 220, the dispatcher and the remote administrator handshake 230, thereby making both the dispatcher and the remote administrator aware of their functions. Additionally, the dispatcher and the agent handshake 240 making both anchors aware of their related functions. In a preferred embodiment, the order of the handshaking steps 230 and 240 is interchangeable and is not critical to the function of the driver. The agent application acts as a command dispatcher for the diagnostic test following installation as a driver. This allows the dispatcher to spawn sub-tests at a lower priority. Accordingly, loading the structure in the form of drivers and adhering to the firmware guidelines allows the drivers within the structure to operate in stages.

Figure 3:
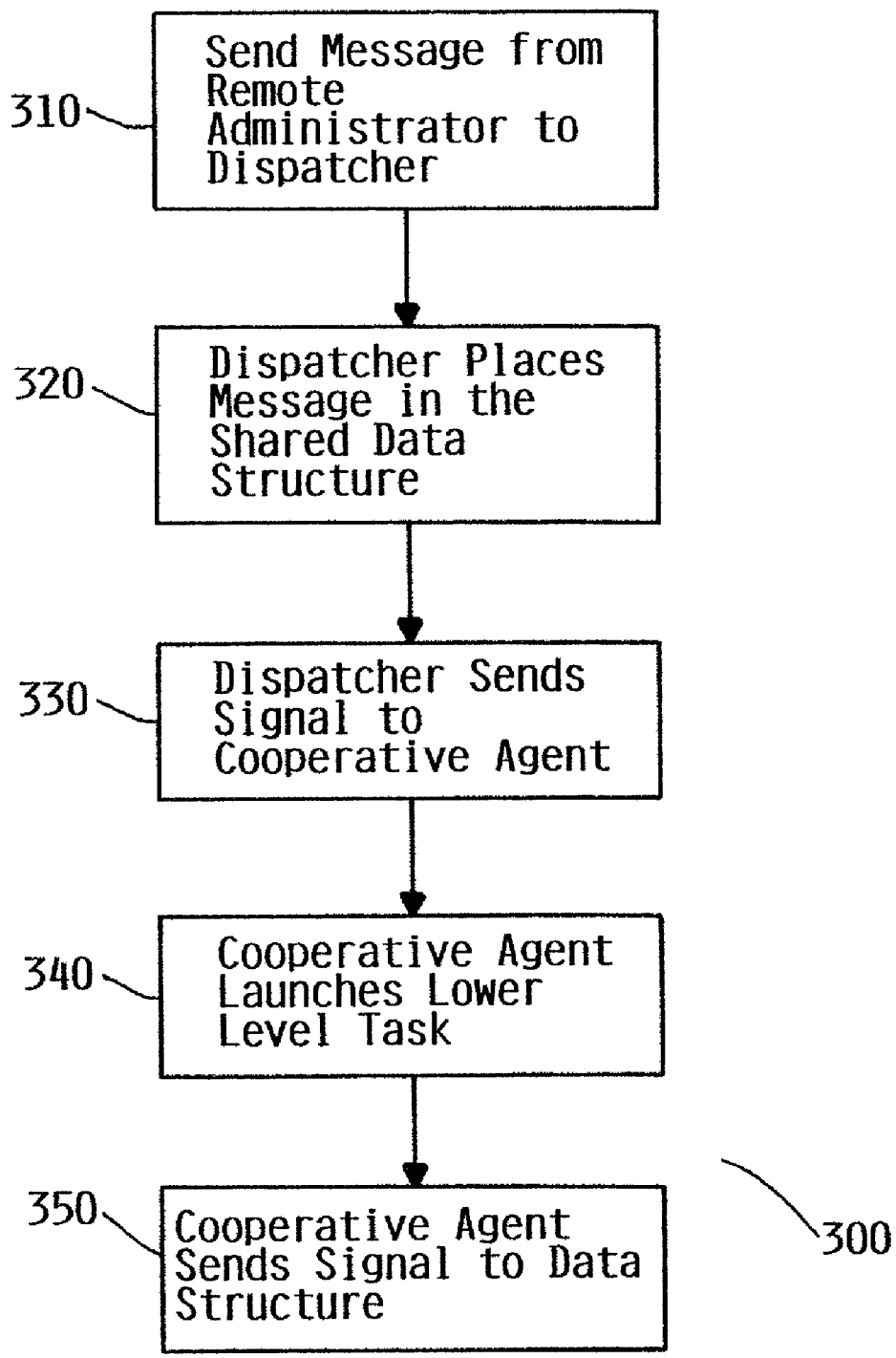
FIG. 3 is a flow chart illustrating the process of launching a lower priority task.

FIG. 3 is a flow chart 300 illustrating the process of launching a lower priority level task from a higher level priority task. The remote administrator sends a message to the dispatcher 310 indicating the need to launch a lower priority level task. The dispatcher communicates receipt of the message from the remote administrator by placing a message in the shared data structure 320. Upon receiving a message from the shared dispatcher, the shared data structure sends a signal to the agent 330 indicating the need to launch a lower priority level task. The agent receives the signal and reads the instructions placed in the shared data structure. Following receipt of the instructions, the agent spawns the requested lower priority level task 340. Once the lower priority level task has been launched, the agent sends a signal to the data structure 350 indicating launching of the lower priority level task. The agent remains idle until the next time it receives a signal 330 from the shared data structure to launch a lower priority level task. Accordingly, the process employed for launching lower priority level tasks from a higher priority level tasks allows the agent to remain in memory in an inactive state until events cause the agent to become active.

Advantages Over the Prior Art

Prior art systems are designed to accommodate system interrupts to permit spawning of different tasks at different levels of operation. To either avoid the use of system interrupts, or in an environment where system interrupts are disabled, the invention permits the launching of lower priority level tasks without requiring the need to invoke a system interrupt or await a pause in the higher level task's operations.

Alternative Embodiments

It will be appreciated that, although specific embodiments of the invention have been described herein for purposes of illustration, various modifications may be made without departing from the spirit and scope of the invention. In particular, the scope of the invention is not limited to a three level system. The invention may be incorporated into a system with fewer or greater priority levels of operations. In addition, the invention may be incorporated into a system designed to accommodate system interrupts. Accordingly, this would allow the system to continue operation by disabling interrupts and incorporating the driver herein to enable launching of lower priority level tasks during operation of a higher priority level task.

In addition to operation of the system, the method of installing the driver is merely a preferred method of installing the components of the driver. However, there may be alternative methods of installation which would allow the components of the driver to function within the design parameters of the system firmware. Additionally, the agent does not necessarily have to be a cooperative agent application. Accordingly, the scope of protection of this invention is limited only by the following claims and their equivalents.

I claim:

1. A computer implemented method for managing tasks comprising:
    a message manager operating at a high priority level receiving a message from a remote administrator within system firmware to launch a low priority task;
    said message manager placing a message in a data structure shared between said message manager and a task manager operating at a low priority level;
    said message manager communicating said low priority task to said task manager through said data structure, wherein the step of communicating said low priority task to said task manager includes setting a flag for signaling receipt of said message and said task manager reading said message in said data structure and launching said low priority task in response to said flag;
    launching said low priority task received from said message manager in response to receipt of said message and absent a suspension selected from the group consisting of: a system interrupt and a pause in a higher level task operation; and
    resetting said flag following launch of said low priority task.

2. The method of claim 1, wherein the step of launching said lower priority task includes an agent.

3. The method of claim 1, wherein the step of receiving said message from said remote administrator includes a dispatcher.

4. The method of claim 1, wherein said message manager maintains a level of operation.

5. A computer implemented method comprising:
    receiving a message from a remote administrator within system firmware to launch a low priority level task, wherein receipt of said message is by a message manager operating at a higher priority level than said low priority level task;
    storing said message in a data structure shared between said message manager and a task manager operating at a low priority level;
    communicating said low priority level task to said task manager through said data structure;
    setting a flag to indicate receipt of said message in said data structure to said task manager;
    reading said message in said data structure and launching said low priority level task in response to said flag by said task manager including said task manager launching said low priority level task received from said message manager in response to said message and absent a suspension selected from the group consisting of: a system interrupt and a pause in a higher level task operation; and
    resetting said flag following launch of said low priority level task.

6. The method of claim 5, further comprising said message manager maintaining a level of operation.

* * * * *